(12) United States Patent
Huang (10) Patent No.: US 10,264,761 B1
(45) Date of Patent: Apr. 23, 2019

(54) PET WATER FOUNTAIN

(71) Applicant: Junzhou Huang, Guangdong (CN)

(72) Inventor: Junzhou Huang, Guangdong (CN)

( * ) Notice: Subject to any disclaimer, the term of this patent is extended or adjusted under 35 U.S.C. 154(b) by 0 days.

(21) Appl. No.: 16/047,053

(22) Filed: Jul. 27, 2018

Related U.S. Application Data (63) Continuation of application No. 15/951,150, filed on Apr. 11, 2018, now Pat. No. 10,165,753.

(30) Foreign Application Priority Data

Mar. 20, 2018  (CN) .................... 2018 2 0380711 U (51) Int. Cl.
*A01K 7/02* (2006.01)
(52) U.S. Cl.
CPC .................................. *A01K 7/02* (2013.01)
(58) Field of Classification Search
CPC . A01K 7/02; A01K 7/00; A01K 7/022; A01K 7/025; A01K 7/04; A01K 63/045; E03B 9/20; B05B 17/08; B05B 17/085; B05B 1/267
See application file for complete search history.

(56) References Cited

U.S. PATENT DOCUMENTS

| 2,509,004 A * | 5/1950 | Lipman | A01K 39/02 119/74 |
|---|---|---|---|
| 2,510,446 A * | 6/1950 | Weil | B05B 17/08 239/23 |
| 2,662,503 A * | 12/1953 | Johnson | A01K 39/022 119/74 |
| 2,888,205 A * | 5/1959 | Trucco | B05B 17/08 239/124 |
| 3,490,694 A * | 1/1970 | Ashby | B05B 17/08 239/18 |
| 3,841,023 A * | 10/1974 | Carlyon, Jr. | A01G 9/023 239/20 |
| 4,836,142 A * | 6/1989 | Duback | A01K 63/003 119/255 |
| 5,501,178 A * | 3/1996 | Kemp | A01K 5/0114 119/255 |

(Continued)

FOREIGN PATENT DOCUMENTS

| GB | 2458173 A * | 9/2009 | ............... A01K 7/00 |
|---|---|---|---|
| JP | 2017148018 A | 8/2017 | |

OTHER PUBLICATIONS

Office Action of counterpart Japanese Patent Application No. 2018-150499 dated Oct. 10, 2018.

*Primary Examiner* — Kathleen I Alker (57) ABSTRACT

A pet water fountain comprises a bucket, a pump, a cover body, a filter, a water platform and a flower nozzle, wherein the cover body is covered on the bucket, the filter is contained in a first recess formed in the center of the cover body, and a first hollow pipe extends from the bottom of the first recess into the bucket; the water platform has a second hollow pipe extending downwards to go through the first hollow pipe to connect a pump outlet of the pump, and has an inner flange higher than an outer flange, and further has an outer sidewall extending downwards to being supported on a first step surrounding the top of the first recess; the flower nozzle has a plurality of spouts and a third hollow pipe extends downwards from the center of the flower nozzle to be inserted into the second hollow pipe.

11 Claims, 6 Drawing Sheets

(56) References Cited

U.S. PATENT DOCUMENTS

| | | | |
|---|---|---|---|
| 5,799,609 A * | 9/1998 | Burns | A01K 7/00 119/74 |
| 5,918,415 A * | 7/1999 | Locke | A01G 27/00 119/74 |
| 5,980,616 A * | 11/1999 | Johnson | B01D 39/086 210/491 |
| 6,257,560 B1 * | 7/2001 | Kim | B01D 47/06 239/17 |
| 6,405,937 B1 * | 6/2002 | Stukenberg | B05B 17/08 239/12 |
| 6,526,916 B1 * | 3/2003 | Perlsweig | A01K 7/06 119/74 |
| 6,527,257 B1 * | 3/2003 | Schuld | B05B 17/085 239/17 |
| 6,652,348 B2 * | 11/2003 | Yen | B05B 17/08 239/17 |
| 6,684,813 B1 * | 2/2004 | Lemon | A01K 45/002 119/69.5 |
| 6,792,891 B1 * | 9/2004 | Coburn | A01K 39/02 119/57.8 |
| 7,089,881 B2 * | 8/2006 | Plante | A01K 5/0114 119/74 |
| 7,270,082 B2 * | 9/2007 | Plante | A01K 7/02 119/74 |
| 7,754,072 B2 * | 7/2010 | Kelly | B05B 17/08 210/151 |
| 8,096,266 B2 * | 1/2012 | Rowe | A01K 7/00 119/74 |
| 8,381,685 B2 * | 2/2013 | Lipscomb | A01K 45/002 119/74 |
| 8,763,557 B2 * | 7/2014 | Lipscomb | A01K 7/02 119/74 |
| 8,813,683 B2 * | 8/2014 | Lipscomb | A01K 45/002 119/74 |
| 8,960,126 B2 * | 2/2015 | Lipscomb | A01K 7/02 119/72 |
| 9,137,968 B2 * | 9/2015 | Veness | A01K 7/00 |
| 9,572,323 B2 * | 2/2017 | Lipscomb | A01K 7/02 |
| 2008/0190374 A1 * | 8/2008 | Farris | A01K 7/00 119/74 |
| 2013/0019809 A1 * | 1/2013 | McCallum | A01K 7/00 119/75 |
| 2013/0199454 A1 * | 8/2013 | Lipscomb | A01K 7/00 119/74 |
| 2014/0251223 A1 * | 9/2014 | Rowe | A01K 7/00 119/74 |
| 2017/0245465 A1 * | 8/2017 | Oates | B65D 21/0234 |

\* cited by examiner

PET WATER FOUNTAIN

CROSS-REFERENCE TO RELATED APPLICATIONS

The present application is a continuing application of a U.S. application Ser. No. 15/951,150 filed on Apr. 11, 2018, which claims the benefit of Chinese Patent Application No. 201820380711.X filed on Mar. 20, 2018. All the above are hereby incorporated by reference.

FIELD

The present application generally relates to pet feeding necessities, more particularly to pet water fountains.

BACKGROUND

With development of economic level and improvement of living quality, more and more people have pets. Traditional and also the simplest device for feeding water to the pets is an open bowl or an open pot which is filled with water for the pets drinking. However, since pets such as cats and dogs like to drink flowing water, these feeding devices don't conform to such habit of the pets due to water filled in these feeding devices being stagnant water. Furthermore, water filled in these feeding devices are exposed to the air, then water will become stale after a certain time. Pets can't drink flowing and fresh water with these feeding devices, thereby healthy of pets will be affected.

SUMMARY

The present application provides a pet water fountain capable of providing flowing and fresh water for pets drinking.

According to one aspect, a pet water fountain comprises a bucket configured to hold water, a pump detachably mounted on the bottom of the bucket, and a cover body detachably mounted on the top of the bucket and covering the bucket, wherein the cover body has a lap edge corresponding to shape of the top of the bucket and residing on the top of the bucket, and a first recess is formed in the center of the cover body, with a first hollow pipe which extends through to the inner of the bucket being located in the center of the first recess, and a plurality of through holes being formed around the first hollow pipe, the cover body further has a first step surrounding the top of the first recess. The pet water fountain further comprises a filter contained in the first recess of the cover body surrounding the first hollow pipe, and a water platform mounted on the cover body, wherein the water platform has a second hollow pipe extending downwards to go through the first hollow pipe to connect a pump outlet of the pump, and the water platform has an inner flange surrounding the second hollow pipe and an outer flange, the inner flange being higher than the outer flange, and the water platform further has an outer sidewall extending downwards to being supported on the first step of the cover body, at least one gap being configured on the bottom of the outer sidewall to allow water overflowed from the outer flange of the water platform flowing through the at least one gap into the first recess and then flowing back into the bucket after being filtered by the filter. The pet water fountain further comprises a flower nozzle mounted on the water platform, wherein the flower nozzle has a plurality of spouts along its periphery and has a third hollow pipe extending downwards from the center of the flower nozzle to being inserted into the second hollow pipe of the water platform, and the flower nozzle further has a top cover covering on the top of the third hollow pipe, water in the bucket being pumped upwards from the pump outlet into the second hollow pipe of the water platform and then into the third hollow pipe of the flower nozzle and then flowing out from the spouts.

In one embodiment, an upper edge is formed on the top of the third hollow pipe of the flower nozzle, and a plurality of petal-shaped bumps are formed and evenly spaced surrounding the upper edge, an interval between each two adjacent petal-shaped bumps forms the spout. The top cover comprises a top baffle covering over inner sides of the plurality of petal-shaped bumps and a fourth hollow pipe extending downwards from the bottom center of the top baffle, and a lower end of the fourth hollow pipe is thread connected with the third hollow pipe, an upper end of the fourth hollow pipe has openings corresponding to each of the spouts.

In one embodiment, a second recess is formed in the bottom of the bucket, and the pump is attached in the second recess by suction cups provided at the bottom of the pump, and a filter sponge is arranged in front of a pump inlet of the pump.

In one embodiment, a wire passage is formed along the inner side of the bucket, and an electrical wire of the pump is led into the wire passage from top to bottom through the bucket and then is led out from the bottom of the bucket. A notch is formed on the top of the wire passage, through which the electrical wire of the pump is led into the wire passage, and the top of the wire passage is stuffed by a sealing cap.

In one embodiment, at least one overflow hole is arranged on a sidewall of the cover body, directly communicated with the inner space of the bucket.

In one embodiment, the cover body is snapped into the bucket by snap-fit connection structures.

In one embodiment, a transparent window is arranged on a sidewall of the bucket.

In one embodiment, the filter comprises a lower layer of non-woven cloth having a plurality of containing cavities and an upper layer of non-woven cloth that is hot melted or ultrasonic welded with the lower layer so as to seal the plurality of containing cavities in which a filter material package of activated carbon and ion-exchange resin is filled.

Objectives, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present application will be better understood with regard to the following description, appended claims, and accompanying drawings as follows:

DETAILED DESCRIPTION

To explain objects, technical solutions and advantages of the present application more clearly, the present application will be further described with reference to the accompanying drawings and embodiments in the following. It should be understood that, the specific embodiments described here are only for explanation, but not for limitation to the present application.

Figure 1:
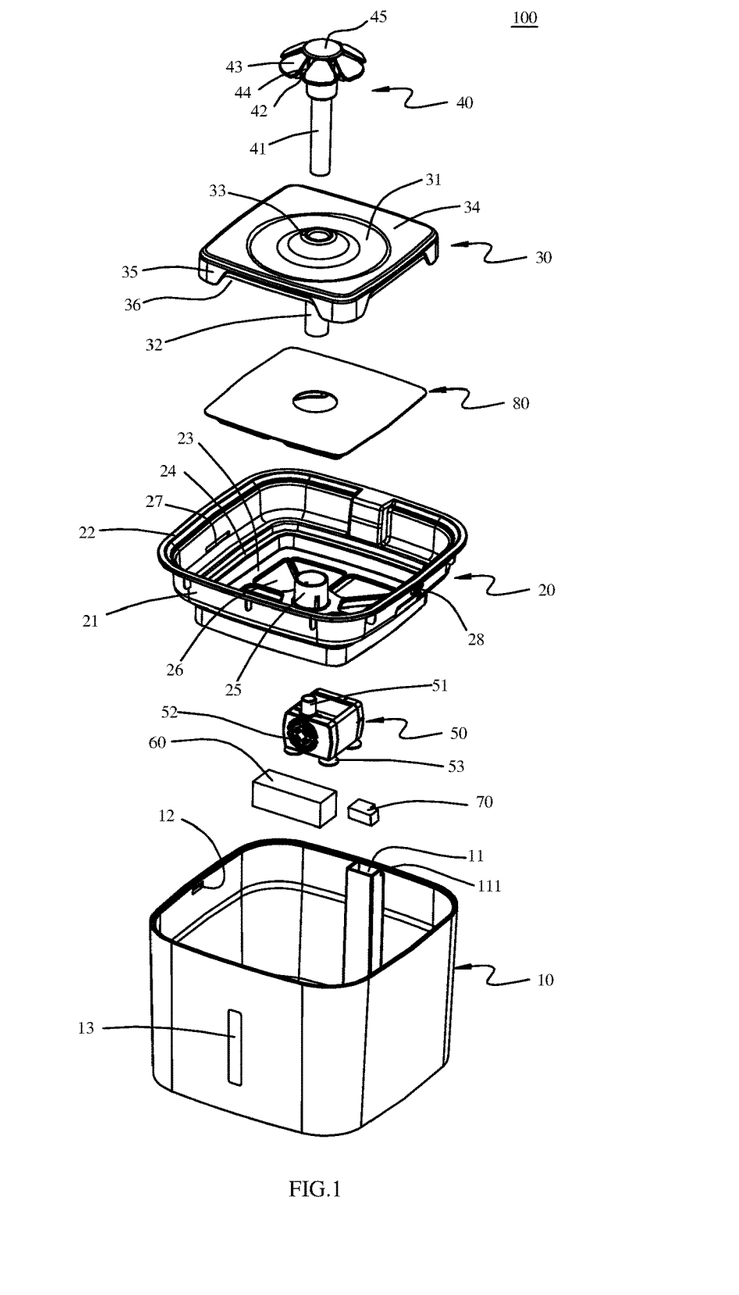
FIG. 1 is an exploded perspective view of a pet water fountain according to an embodiment of the present application.
Figure 2:
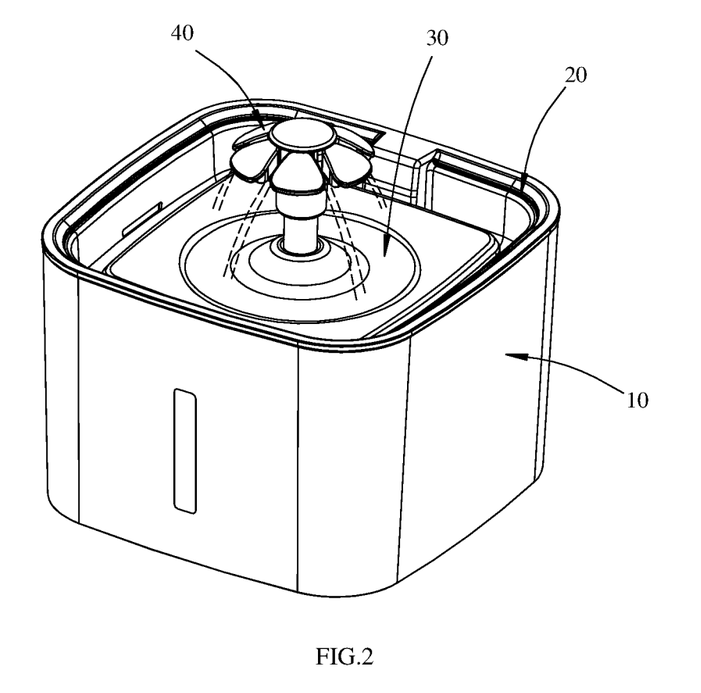
FIG. 2 is a perspective view of the pet water fountain shown in FIG. 1 in assembled state.
Figure 3:
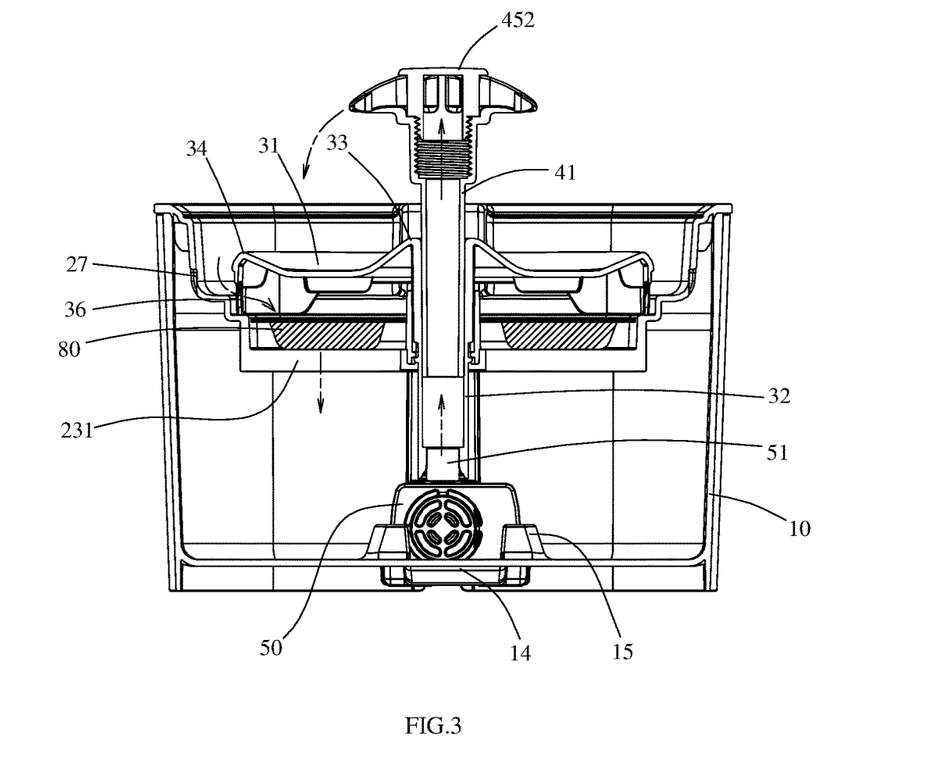
FIG. 3 is a sectional view of the pet water fountain shown in FIG. 2.

According to an embodiment as shown in FIG. 1 to FIG. 3, a pet water fountain 100 mainly comprises a bucket 10, a cover body 20, a water platform 30, a flower nozzle 40, a pump 50 and a filter 80. The bucket 10 is closed at the bottom, but opening at the top, used to hold water for pets drinking. A transparent window 13 is arranged on at least one sidewall of the bucket 10, facilitating users to watch water level inside the bucket 10. A recess 14 is formed in the bottom of the bucket 10, and four angle blocks 15 are located along the recess 14 (referring to FIG. 3). The pump 50 is detachably attached in the recess 14. For example, the pump 50 may be attached in the recess 14 by suction cups 53 provided at the bottom of the pump. Preferably, a filter sponge 60 is arranged in front of a pump inlet 52 of the pump 50. The filter sponge 60 is configured to pre-filter water flowing into the pump 50. Further as shown in FIG. 1, a wire passage 11 is formed along the inner side of the bucket 10. The wire passage 11 extends from the top of the bucket 10 downwards to go through the bottom of the bucket 10. An electrical wire of the pump 50 may be led into the wire passage 11 from top to bottom through the bucket 10 and then led out from the bottom of the bucket 10. Compared to traditional design of leading the electrical wire out directly from the bottom of the bucket 10, such design in the present application can ensure that water in the bucket 10 will not leak out from the wire leading hole. Furthermore, a notch 111 is formed on the top of the wire passage 11. Through the notch 111, the electrical wire of the pump 50 is led into the wire passage 11, and then a sealing cap 70 such as a rubber sealing cap stuffs the top of the wire passage 11 so as to more effectively avoid water leaking from the wire passage 11.

Further as shown in FIG. 1 to FIG. 3, the cover body 20 is detachably mounted on the top of the bucket 10 and covers the bucket 10. Referring to FIG. 1, the cover body 20 has a lap edge 22 corresponding to shape of the top of the bucket 10. The lap edge 22 resides on the top of the bucket 10. The cover body 20 is snapped into the bucket 10 by protruding elements 28 formed on the outer side of two sidewalls 21 of the cover body 20 being engaged with corresponding slot elements 12 formed on the inner side of the sidewalls of the bucket 10. A recess 23 is formed in the center of the cover body 20 for containing the filter 80. Specifically as shown in FIG. 1 and FIG. 3, a first hollow pipe 25 extends from the center of the recess 23 downwards to the inner space of the bucket 10, and a plurality of through holes 26 are formed around the first hollow pipe 25 on the bottom of the recess 23. The filter 80 is placed in the recess 23, surrounding the first hollow pipe 25. The cover body 20 further has a first step 24 extending outwardly surrounding the top of the first recess 23. The first step 24 is configured to install the water platform 30. The water platform 30 has an external contour consistent with the shape of the first step 24, and in the center of the water platform 30, a second hollow pipe 32 extends downwards to go through the first hollow pipe 25 to connect a pump outlet 51 (referring to FIG. 3) of the pump 50. Further, the water platform 30 has an inner flange 33 surrounding the top of the second hollow pipe 32, and the water platform 30 also has an outer flange 34 along its outer periphery, thereby a water containing space 31 is formed between the inner flange 33 and the outer flange 34, and the inner flange 33 must be higher than the outer flange 34 so as to ensure that water in the water platform 30 only overflows from the outer periphery of the water platform 30. The water platform 30 further has an outer sidewall 35 extending downwards to being supported on the first step 24 of the cover body 20, and four gaps 36 are respectively configured on the bottom of the four outer sidewalls 35 to allow water overflowed from the outer flange 34 of the water platform 30 flowing through the four gaps 36 into the recess 23 of the cover body 20, and then flowing back into the bucket 10 via the plurality of through holes 26 after being filtered by the filter 80 in the recess 23.

Figure 4:
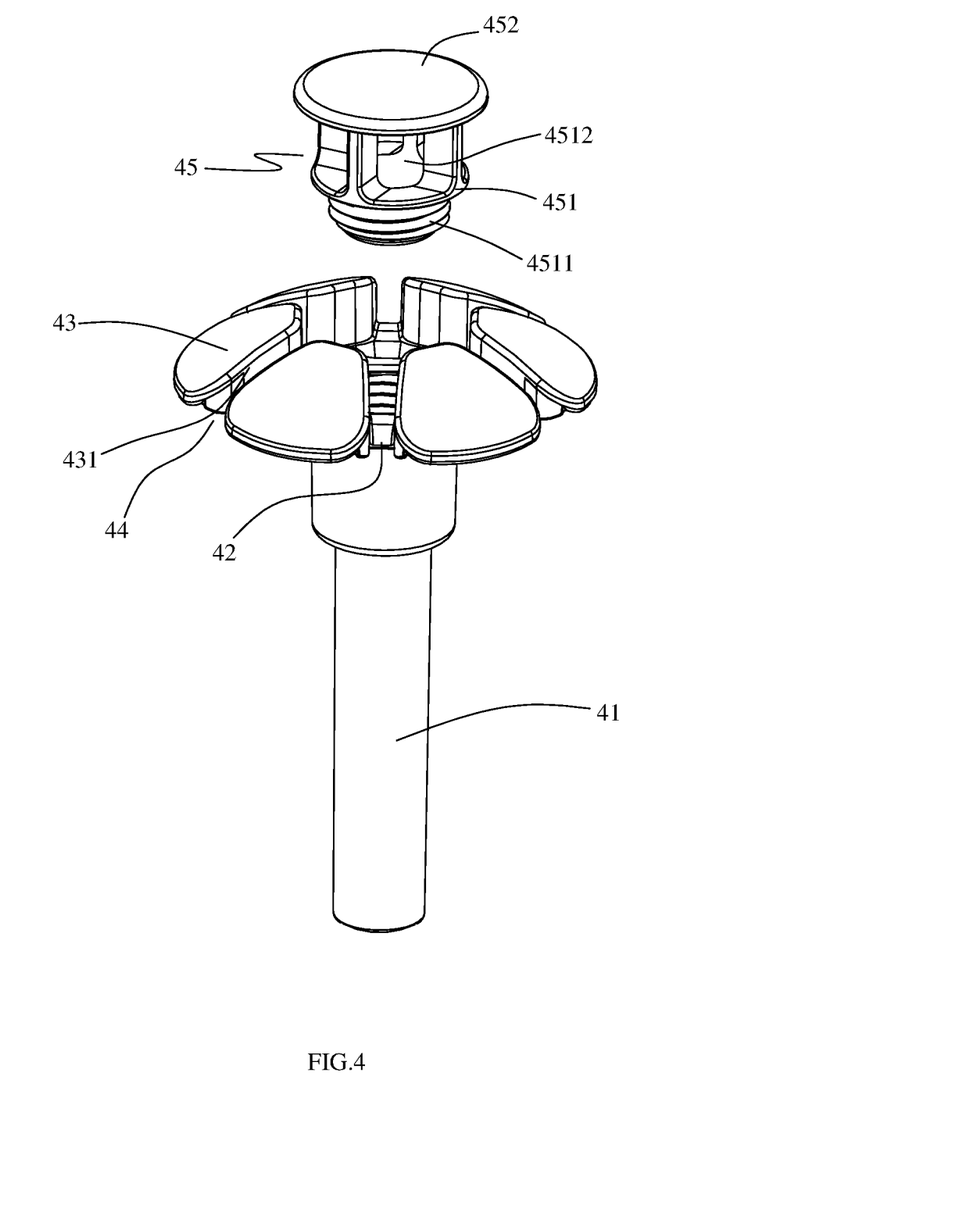
FIG. 4 is an exploded perspective view of a flower nozzle according to an embodiment of the present application.
Figure 5:
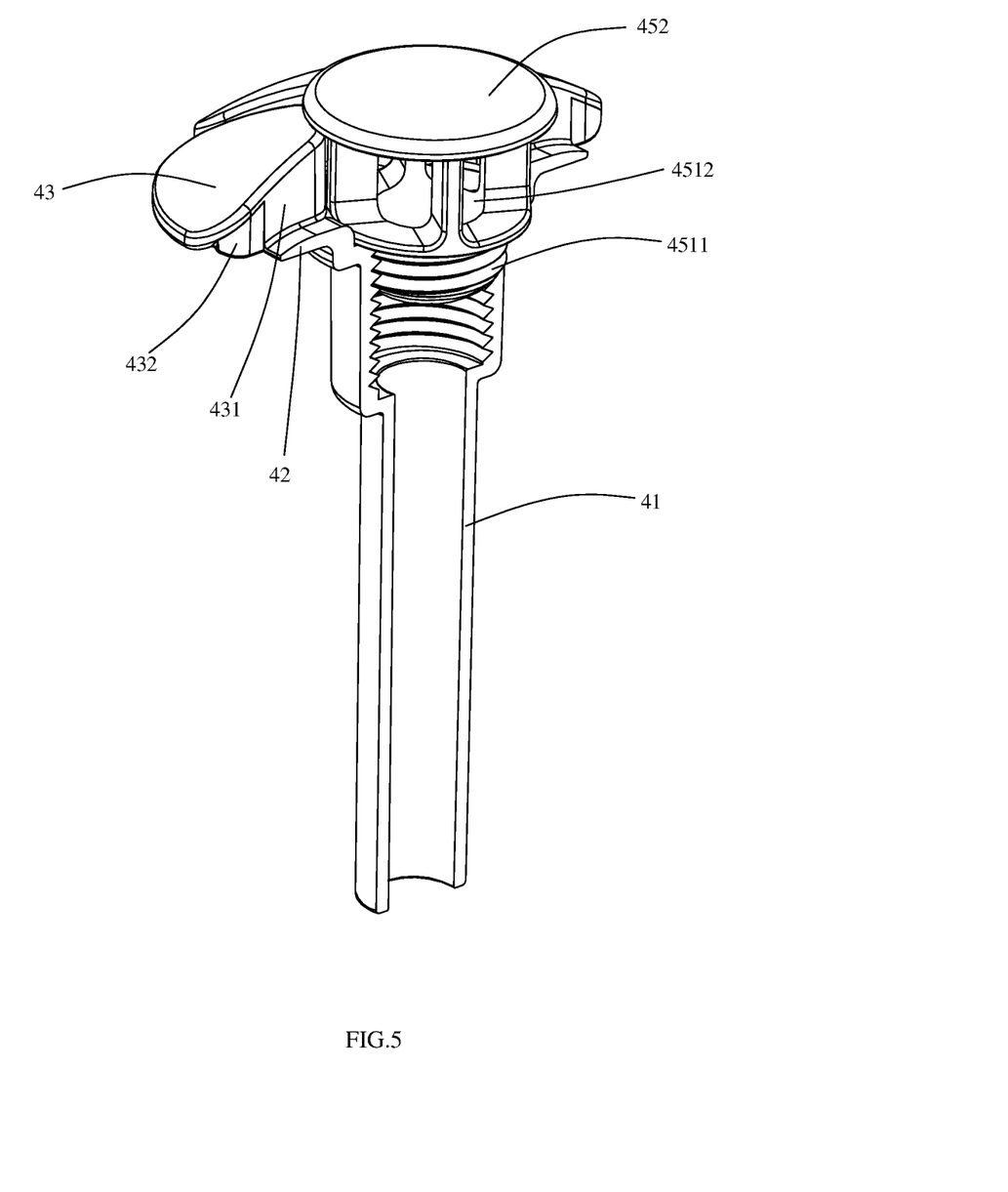
FIG. 5 is a part sectional view of the flower nozzle shown in FIG. 4.

Further as shown in FIG. 1 to FIG. 3, the flower nozzle 40 is mounted on the water platform 30. The flower nozzle 40 has a plurality of spouts 44 along its periphery and has a third hollow pipe 41 extending downwards from the center of the flower nozzle 40 to being inserted into the second hollow pipe 32 of the water platform 30. The flower nozzle 40 further has a top cover 45 covering on the top of the third hollow pipe 41. Water in the bucket 10 is pumped upwardly from the pump outlet 51 into the second hollow pipe 32 of the water platform 30 and then into the third hollow pipe 41 of the flower nozzle 40 and then flowing out from the spouts 44. Specifically as shown in FIG. 4 and FIG. 5, an upper edge 42 extending outwardly is formed on the top of the third hollow pipe 41 of the flower nozzle 40, and a plurality of petal-shaped bumps 43 are formed and evenly spaced surrounding the upper edge 42, an interval between each two adjacent petal-shaped bumps 43 forms the spout 44. That is to say, each spout 44 is surrounded by sidewalls 431 of the two adjacent petal-shaped bumps 43 and the upper edge 42. Furthermore, the sidewalls 431 of the petal-shaped bumps 43 may extend outwardly beyond the upper edge 42 to form baffles 432 (as shown in FIG. 5) which ensures water can flow out from the spouts 44 more freely. Again referring to FIG. 4 and FIG. 5, the top cover 45 comprises a top baffle 452 covering over inner sides of the plurality of petal-shaped bumps 43, and a fourth hollow pipe 451 extends downwards from the bottom center of the top baffle 452. A lower end of the fourth hollow pipe 451 has external thread 4511 which is inserted into the third hollow pipe 41 and is thread connected with the third hollow pipe 41. An upper end of the fourth hollow pipe 451 has openings 4512 so as to ensure that each of the spouts 44 is opposite to one of the openings 4512 when the fourth hollow pipe 451 is thread connected with the third hollow pipe 41. Therefore, after water in the bucket 10 is pumped upwardly from the pump outlet 51 into the second hollow pipe 32 of the water platform 30 and then into the third hollow pipe 41 of the flower nozzle 40, water will be blocked by the top baffle 452 and then flow out from the spouts 44. In the other embodiments according to the present application, bumps 43 forming the spouts may be designed as various shapes, not being restrictive of the petal-shape as shown in the figures, so as to bring different aesthetic effect.

Figure 6:
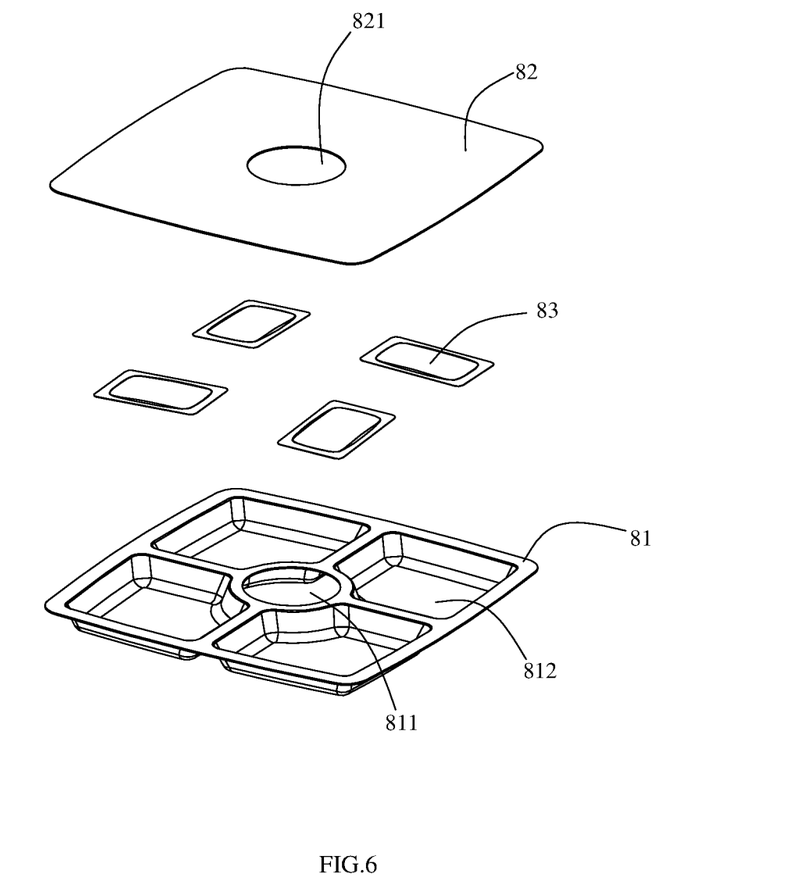
FIG. 6 is an exploded perspective view of a filter according to an embodiment of the present application.

As shown by the dotted lines in FIG. 3, water circulation process of the pet water fountain 100 is as below: water in the bucket 10 is pumped by the pump 50 into the second hollow pipe 32, then flows out from the plurality of spouts 44 of the flower nozzle 40 through the third hollow pipe 41, and then falls into the water containing space 31 on the water platform 30; when water level in the water containing space 31 is high over the outer flange 34, water overflows from the outer flange 34 into the recess 23 via the gaps 36, and then flows back into the bucket 10 via the through holes 26 on the bottom 231 of the recess 23 after being filtered by the filter 80. Additionally, at least one overflow hole 27 is arranged on the sidewall of the cover body 30, directly communicated with the inner space of the bucket 10. Water overflowing from the recess 23 may be directly flow back into the bucket 10 via the overflow hole 27. Then water flows through the filter sponge 60 and is pumped into the second hollow pipe 32 again by the pump 50. Thus water circulation is realized, and water is cyclically filtered to keep fresh so as to protect health of the pets. FIG. 6 shows the structure of the filter 80 in the pet water fountain 100 according to an embodiment of the present application. The filter 80 comprises a lower layer of non-woven cloth 81 and an upper layer of non-woven cloth 82, and both of them have corresponding central holes 811 and 821. The lower layer of non-woven cloth 81 has a plurality of containing cavities 812, and the upper layer of non-woven cloth 82 is hot melted or ultrasonic welded with the lower layer 81 so as to seal the plurality of containing cavities 821. A filter material package 83 of activated carbon and ion-exchange resin is filled in each of the containing cavities 821, used for filtering water flowing back into the bucket 10.

Although the present application has been described with reference to specific embodiments thereof, these embodiments are merely illustrative, and not restrictive of, the present application. Various modifications or changes to the specifically disclosed exemplary embodiments will be suggested to persons skilled in the art. In summary, the scope of the application should not be restricted to the specific exemplary embodiments disclosed herein, and all modifications that are readily suggested to those of ordinary skill in the art should be included within the spirit and purview of this application and scope of the appended claims.

I claim:

1. A pet water fountain comprising:
a bucket configured to hold water;
a pump positioned in the bucket;
a cover body;
a water platform on top of the cover body;
a filter being arranged between the cover body and the water platform; and
a flower nozzle mounted on the water platform;
wherein a pump outlet of the pump communicates with a water inlet of the water platform; wherein water in the bucket is pumped upwards from the pump outlet into the water inlet of the water platform and then into the flower nozzle, and then falls back on the water platform from the flower nozzle, and then flows from the water platform back into the bucket through the cover body after being filtered by the filter;
wherein the flower nozzle has a third hollow pipe extending downwards from the center of the flower nozzle to be inserted into a second hollow pipe which is used as the water inlet of the water platform, and an upper edge is formed on a top of the third hollow pipe, and a plurality of petal-shaped bumps are formed and evenly spaced surrounding the upper edge, an interval between each two adjacent petal-shaped bumps of the plurality of petal-shaped bumps forms a spout; and the flower nozzle further has a top cover covering the top of the third hollow pipe, wherein the top cover comprises a top baffle covering inner sides of the plurality of petal-shaped bumps and a fourth hollow pipe extending downwards from a bottom center of the top baffle, and a lower end of the fourth hollow pipe is connected with the third hollow pipe, an upper end of the fourth hollow pipe has openings corresponding to each spout, such that water in the bucket is pumped upwards from the pump outlet into the second hollow pipe of the water platform and then into the third hollow pipe of the flower nozzle and then flows out from each spout.

2. The pet water fountain of claim 1, wherein the cover body has a lap edge residing on a top of the bucket, and a first recess is formed in the center of the cover body, with a first hollow pipe being located in the center of the first recess, and a plurality of through holes being formed in the first recess around the first hollow pipe; the filter is contained in the first recess surrounding the first hollow pipe.

3. The pet water fountain of claim 2, wherein at least one overflow hole is arranged on the cover body, directly communicating with an inner space of the bucket.

4. The pet water fountain of claim 2, wherein the second hollow pipe of the water platform extends downwards and passes through the first hollow pipe, and then is connected to the pump outlet, and the water platform has an inner flange surrounding the second hollow pipe and an outer flange, the inner flange being higher than the outer flange, thus water overflows from the outer flange of the water platform back into the bucket through the cover body after being filtered by the filter.

5. The pet water fountain of claim 4, wherein the water platform further has an outer sidewall extending downwards to be supported on a first step of the cover body surrounding a top of the first recess, at least one gap being configured on a bottom of the outer sidewall to allow water overflowing from the outer flange of the water platform to flow through the at least one gap into the first recess and then flow back into the bucket after being filtered by the filter.

6. The pet water fountain of claim 1, wherein a second recess is formed in a bottom of the bucket, and the pump is attached in the second recess by suction cups provided at a bottom of the pump, and a filter sponge is arranged in front of a pump inlet of the pump.

7. The pet water fountain of claim 1, wherein a wire passage is formed along an inner side of the bucket, such that an electrical wire of the pump may be led into the wire passage from top to bottom of the wire passage through the bucket and then out from a bottom of the bucket.

8. The pet water fountain of claim 7, wherein a notch is formed on a top of the wire passage, such that the electrical wire of the pump may be led into the wire passage through the notch, and the top of the wire passage is stuffed by a sealing cap.

9. The pet water fountain of claim 1, wherein the cover body is snapped into the bucket by snap-fit connection structures.

10. The pet water fountain of claim 1, wherein at least one transparent or semitransparent window is arranged on a sidewall of the bucket.

11. The pet water fountain of claim 1, wherein the filter comprises a lower layer of non-woven cloth having a plurality of containing cavities and an upper layer of non-woven cloth that is attached to the lower layer so as to seal the plurality of containing cavities, and each of the plurality of containing cavities is filled with a filter material package.

* * * * *